(12) United States Patent
Sieh et al.

(10) Patent No.: US 11,746,905 B2
(45) Date of Patent: Sep. 5, 2023

(54) FILTER ARRANGEMENT WITH A GEL SEAL AND USE OF SUCH A FILTER ARRANGEMENT AS AN INTERIOR AIR FILTER

(71) Applicant: Carl Freudenberg KG, Weinheim (DE)

(72) Inventors: Maik Sieh, Sandhausen (DE); Morfula Chirnside, Schwetzingen (DE)

(73) Assignee: CARL FREUDENBERG KG, Weinheim (DE)

( * ) Notice: Subject to any disclaimer, the term of this patent is extended or adjusted under 35 U.S.C. 154(b) by 1151 days.

(21) Appl. No.: 16/387,570

(22) Filed: Apr. 18, 2019

(65) Prior Publication Data

US 2020/0032905 A1 Jan. 30, 2020

(30) Foreign Application Priority Data

Jul. 24, 2018 (EP) .................................... 18185206

(51) Int. Cl.
*F16J 15/14* (2006.01)
*F16J 15/02* (2006.01)
*B01D 46/00* (2022.01)
*B01D 46/10* (2006.01)

(52) U.S. Cl.
CPC .......... *F16J 15/14* (2013.01); *B01D 46/0005* (2013.01); *F16J 15/022* (2013.01); *B01D 46/10* (2013.01); *B01D 2201/30* (2013.01); *B01D 2201/34* (2013.01); *B01D 2271/00* (2013.01); *B01L 2300/0681* (2013.01)

(58) Field of Classification Search
CPC . F16J 15/14; F16J 15/022; F16J 15/02; B01D 46/0005; B01D 46/10; B01D 46/521; B01D 46/0002; B01D 46/12; B01D 46/4227; B01D 46/0097; B01D 46/52; B01D 46/00; B01D 46/42; B01D 2201/30; B01D 2201/34; B01D 2271/00; B01D 2271/02; B01D 2271/025; B01D 2259/4566; B01L 2300/0681
USPC ......................................................... 55/350.1
See application file for complete search history.

(56) References Cited

U.S. PATENT DOCUMENTS

| | | | | |
|---|---|---|---|---|
| 5,279,632 A | * | 1/1994 | Decker .............. | B01D 46/0005 55/385.2 |
| 5,865,674 A | * | 2/1999 | Starr ...................... | B01D 46/12 454/294 |
| 2009/0056293 A1 | * | 3/2009 | Styles .................... | B01D 46/10 55/497 |

FOREIGN PATENT DOCUMENTS

| | | | | |
|---|---|---|---|---|
| EP | 1266101 A1 | 12/2002 | | |
| EP | 2149405 A1 | * 2/2010 | ............. | B01D 46/10 |
| EP | 2149405 B1 | 2/2010 | | |
| WO | WO 91/19898 | * 12/1991 | ............. | B01D 46/52 |
| WO | WO 9119898 A1 | 12/1991 | | |
| WO | WO 02053850 A1 | 7/2002 | | |

* cited by examiner

*Primary Examiner* — Akash K Varma
(74) *Attorney, Agent, or Firm* — LEYDIG, VOIT & MAYER LTD.

(57) ABSTRACT

A filter arrangement includes: a filter element in a first filter stage, the filter element having a filter material for filtering an air stream; a housing for receiving the filter element; and a circumferential gel seal arranged between the filter element and the housing in order to seal the filter element from the housing.

13 Claims, 10 Drawing Sheets

FILTER ARRANGEMENT WITH A GEL SEAL AND USE OF SUCH A FILTER ARRANGEMENT AS AN INTERIOR AIR FILTER

CROSS-REFERENCE TO PRIOR APPLICATION

Priority is claimed to European Patent Application No. EP 18 185 206.2, filed on Jul. 24, 2018, the entire disclosure of which is hereby incorporated by reference herein.

FIELD

The invention relates to a filter arrangement and the use of such a filter arrangement, and serves to filter an air stream.

BACKGROUND

When using filter arrangements in air filtration, it is important that the filter be well-sealed from the housing carrying air, and that the air not be able to pass between the housing and the filter. There is to be no bypass, and a leak-free seal is to be present.

In US 2009/0056293 A1, this requirement is met by proposing an air filtration system that has interlocking frame elements and, as a sealing element, additional protruding flaps of the filter material. On the one hand, such an air filtration system has a complicated structure. On the other hand, when mounting the filter, it must be ensured that the additional flaps are not damaged. Otherwise, a bypass is created, and the efficiency of the filter system is impaired.

Other methods for sealing filters are also known from the prior art. In hoods for air conditioning devices for clean rooms, gel channels with cutters intervening in them are used. Such a filter is described, for example, in EP 2 149 405 B1. However, such sealing solutions cannot be used in the first filter stage, since the raw gas would introduce particles into the gel and would result in the rapid aging of the gel. Such a sealing solution would not enable a leak-free seal.

SUMMARY

In an embodiment, the present invention provides a filter arrangement, comprising: a filter element in a first filter stage, the filter element having a filter material configured to filter an air stream; a housing configured to receive the filter element; and a circumferential gel seal arranged between the filter element and the housing in order to seal the filter element from the housing.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a filter arrangement that ensures a leak-free seal when a filter element is mounted in an easy-to-handle manner.

The filter arrangement according to the invention has a filter element, and the filter element is used in a first filter stage. Here, the first filter stage means that the raw gas to be filtered makes contact directly—without a prefilter—on the filter element and is filtered at such point for the first time. The filter arrangement can have still further filter elements in further downstream filter stages. In addition, the filter arrangement has a housing to accommodate the filter element. Thereby, the filter element has a filter material for the filtration of an air stream. In an advantageous manner, a gel seal encircling the filter element is arranged between the filter element and the housing in order to seal the filter element from the housing. Thereby, the gel seal can be designed, in particular, as a gel channel, viz., as a groove-shaped channel with a gel filling, wherein PU or silicone, for example, can be used as the gel. Advantageously, the filter arrangement has a cutter encircling the filter element which, when the filter is mounted in the housing, dips into the gel seal, viz., into the gel filling of the gel channel, and further has a cover element encircling the filter element for covering the gel channel on the raw gas side of the filter arrangement. The cover element helps to prevent or at least reduce the ingress of dirt, e.g., dust, through the air stream. In such a filter arrangement, a simple mounting of the filter element is made possible, and a leak-free seal is ensured at the same time.

For an effective seal and a reduced ingress of dirt into the gel of the gel channel, it happens that the gel channel, the cutter, and the cover element have the same shape in a plan view, in such a manner that the cutter is able to dip more or less in the middle into the gel channel, and that the part, open towards the raw gas side, of the gel channel between the cutter and the boundary of the gel channel is covered by the cover element.

In an advantageous development of the filter arrangement according to the invention, different designs of the cutter are possible.

In a first variant, the cutter is formed by an end pleat of the filter material that, compared to the other pleat sections, is longer.

In a second variant, the cutter is formed by an edge strip glued to the filter pack.

In a third variant, the cutter is formed by a bar protruding from a filter frame for holding the filter element, similar to a flange, and is shaped as a strip that is raised with respect to the surface of the filter frame.

In a fourth variant, the cutter is formed by a bar protruding from the housing, designed as a bar that is raised with respect to the surface of the housing.

If the filter element has a basic hexahedral shape, in a preferred embodiment, the cutter can be formed on two opposite sides by an end pleat of the filter material and, on the other two sides, by an edge strip. The advantage of this embodiment is a particularly low material input.

In an alternative, likewise particularly advantageous embodiment, the cutter is formed only by edge strips. The advantage of this embodiment is a particularly simple production of the filter arrangement. Further combinations for the formation of the cutter from the aforementioned variants are conceivable.

In an advantageous development of the filter arrangement according to the invention, the cover element can have different shapes.

In a first variant, the cover element is formed by a strip-shaped flap at the end pleat of the filter material—for example, by a V-shaped flap. A V-shaped flap is understood as a pleat section protruding from the end pleat at an angle, wherein the flap is uniform in material and in one piece with the filter material.

In a second variant, the cover element is formed by a strip-shaped flap on an edge strip glued to the filter pack—for example, by a V-shaped flap. Thereby, a V-shaped flap is understood as a pleat section protruding from the edge strip at an angle, wherein the flap is uniform in material and in one piece with the edge strip.

In a third variant, the cover element is formed by a filter frame in order to hold the filter element.

In a fourth variant, the cover element is formed by a separate sealing element attached to the filter element.

In a fifth variant, the cover element is formed by the housing itself.

If the filter element has a basic hexahedral shape, in a preferred embodiment, the cover element can be formed on two opposite sides by, in each case, a strip-shaped flap at the end pleat of the filter material and, on the other two sides, by a strip-shaped flap on an edge strip. The advantage of this embodiment is a particularly low material input.

In an alternative, likewise advantageous embodiment, the cover element is formed only by strip-shaped flaps on edge strips. The advantage of this embodiment is a particularly simple and cost-effective production. Further combinations of the aforementioned variants for the formation of the cover element are conceivable.

With regard to the positioning of the gel channel, there are two different options. The circumferential gel channel can be attached either to the filter element or to the housing. There are different advantages to each of the two options. If the circumferential gel channel is positioned on the filter element, it is particularly easy to replace the gel channel together with the exchange of the filter element. The positioning of the circumferential gel channel on the housing has the advantage that the gel channel can still be used even if the filter element is exchanged. Depending upon the point of use of the filter arrangement and the degree of contamination of the air stream to be cleaned and the ambient conditions, one of the two options can be selected.

In a particularly advantageous development of the filter arrangement, the filter material can be designed as a pleated filter pack—as a so-called filter pack with a zigzag-shaped bellows made of an organic or inorganic, nonwoven fabric.

The invention also relates to a filter arrangement with at least one further filter element in a further filter stage. The further filter element has a filter material for filtering the air stream. The filter arrangement is thus constructed in a multi-staged manner.

In a first variant, between the first and the at least one further filter element, a further circumferential gel seal is arranged for sealing the filter elements from one another.

In a second variant, between a respective filter element and the housing, a circumferential gel seal is, in each case, arranged for sealing a respective filter element from the housing.

The invention also relates to the use of a filter arrangement, as described above, as an interior air filter for filtering the cabin supply air in a vehicle. The filter arrangement can be used for fresh air filtration or for circulating air filtration. The vehicle may, in particular, be a vehicle used in agriculture, such as a tractor or a harvester.

The described invention and the described advantageous developments of the invention in combination with one another, insofar as this is technically sensible, also constitute advantageous developments of the invention.

The invention relates to a filter arrangement 10 and the use of such a filter arrangement, and serves to filter an air stream. The filter arrangement 10 according to the invention has a filter element 1 in a first filter stage and a housing 20 for receiving the filter element 1, wherein the filter element 10 has a filter material 2. In an advantageous manner, a circumferential gel seal 4 is arranged between the filter element 1 and the housing 20 in order to seal the filter element 1 from the housing 20. This is especially designed as a gel channel 4.1. Such a filter arrangement 10 ensures an easy-to-use mounting of a filter element 1 and a leak-free seal in the mounted state.

Figure 1:
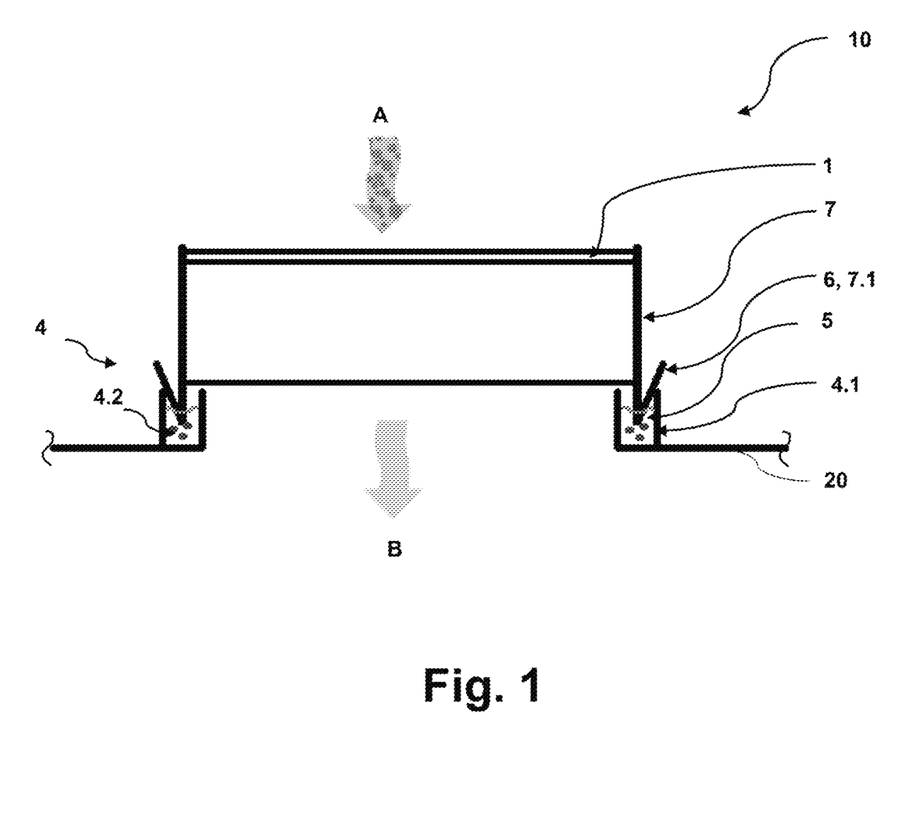
FIG. 1 shows a first embodiment of a filter arrangement according to invention.

FIG. 1 shows a first embodiment of a filter arrangement 10. The filter arrangement 10 has a filter element 1, which is attached to a housing 20. An air stream—represented by arrows—flows from the raw gas side A through the filter element 1 to the clean gas side B. The filter element 1 is mounted in a leak-free manner on the housing 20, and there is no bypass for the air stream between the filter element 1 and the housing 20. For this purpose, the filter arrangement 10 has a gel seal 4, which is formed circumferentially to the filter element 1 and extends along the opening in the housing 20. The gel seal 4 has a groove-shaped gel channel 4.1, which is filled with a gel 4.2 (represented by several points). On the filter element 1, which comprises a pleated filter pack 3, edge strips 7 are glued to the side surfaces of the filter pack 3. Such edge strips 7 form a cutter 5 at each of their lower ends, which dips into the gel channel 4.1. This results in a seal on the raw gas side A between the filter element 1 and the housing 20. The edge strips 7 are additionally provided with a flap 7.1, such that the edge strip 7 has an approximately V-shaped design. As such, the flap 7.1 can also be referred to as the V-shaped flap. The V-shaped flap represents a pleat section protruding from the edge strip at an angle, which is uniform in material and in one piece with the edge strip 7. With its underside, the flap 7.1 rests on an upper edge of the gel channel 4.1 and thus forms a cover element 6 of the gel channel 4.1. The cover element 6 prevents particles from the raw gas side A from being introduced into the gel 4.2, which would lead to the contamination and premature aging of the gel 4.2.

Figure 2:
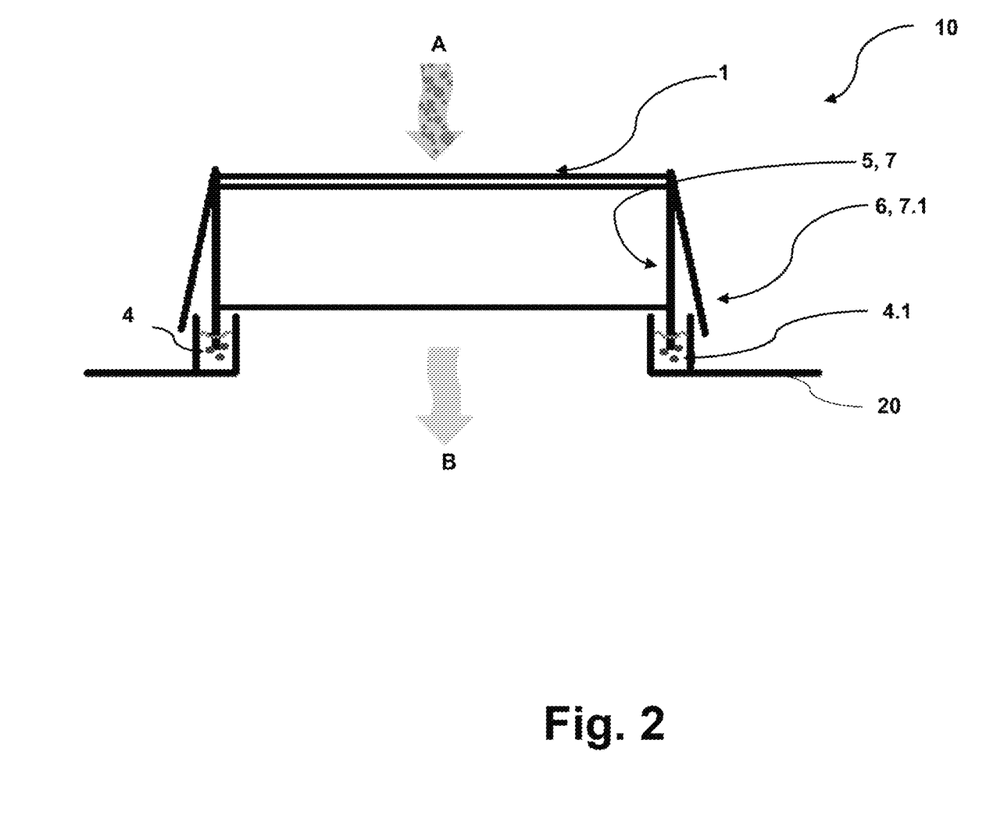
FIG. 2 shows a second embodiment of a filter arrangement according to the invention.

FIG. 2 shows a similar design of the filter arrangement 10, wherein the cover element 6 has a different design: The cover element 6 is likewise formed by part of the edge strip 7. A flap 7.1 of the edge strip 7 is provided for this purpose, which flap touches the edge strip 7 at the upper end of the edge strip 7. Thereby, the flap 7.1 can be formed by folding the edge strip 7, or can be produced by gluing or otherwise attaching an additional edge strip to the edge strip 7. The lower end of flap 7.1 covers the gel channel 4.1 in a manner similar to a hipped roof. The cover element 6 prevents dirt from entering the gel 4.2.

Figure 3:
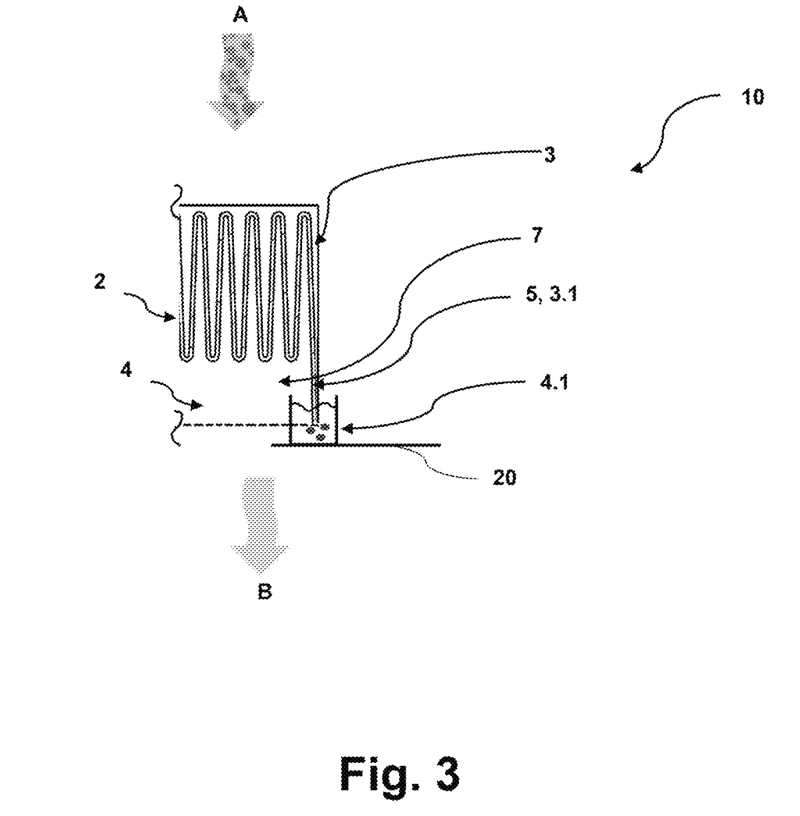
FIG. 3 shows a third embodiment of a filter arrangement according to the invention.

In the design variant of the filter arrangement 10 shown in sections in FIG. 3, the cutter 5 on two sides of the pleated filter pack 3 is formed by an extended end pleat 3.1 of the filter pack. FIG. 3 shows only one side of the pleated filter pack 3. As can be seen, the pleated filter pack 3 is formed by zigzag-shaped, folded filter material made of nonwoven fabric 2. On the other two sides of the pleated filter pack 3, which lie in front of and behind the drawing plane, the cutter 5 is formed by edge strips 7, which are connected to the filter pack 3. The edge strips 7 are indicated by a dashed line in the representation of FIG. 3. For better clarity, the cover element 6 is not shown in FIG. 3. The cover element 6 can be designed, for example, as shown in FIG. 2.

Figure 4:
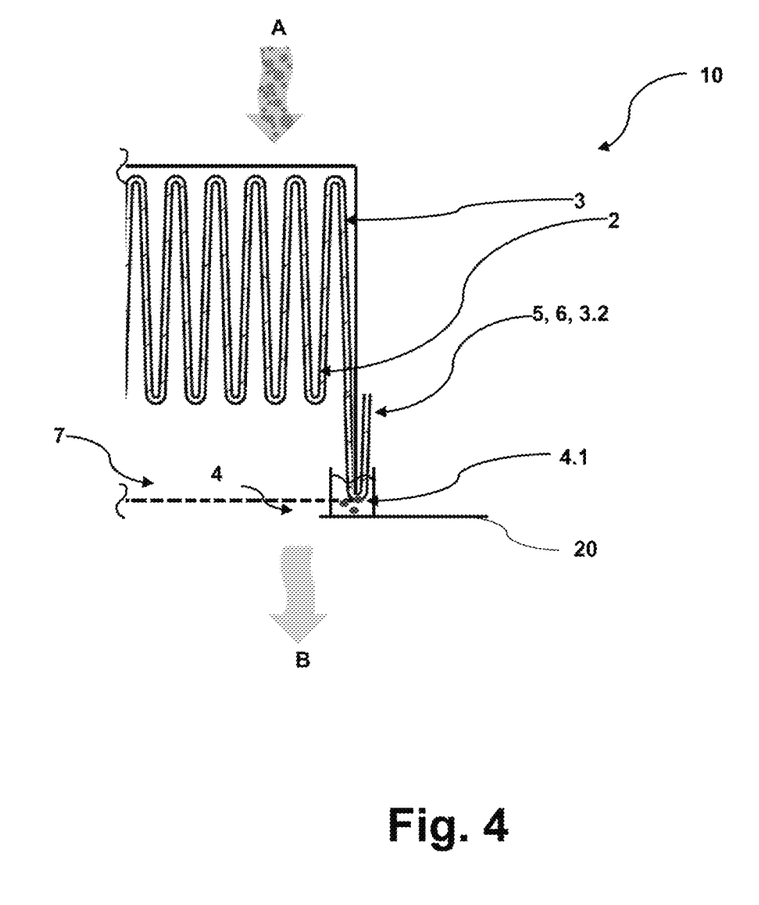
FIG. 4 shows a fourth embodiment of a filter arrangement according to the invention.

Alternatively, the cover element 6 on both sides of the end pleat 3.1 can also be realized by providing an additional flap 3.2, as shown in FIG. 4. For this purpose, an additional folding has been inserted into the end pleat 3.1, which forms a flap 3.2, which lies with its underside on the edge of the gel channel 4.1. This also prevents dirt from penetrating the gel channel 4.1.

Figure 5:
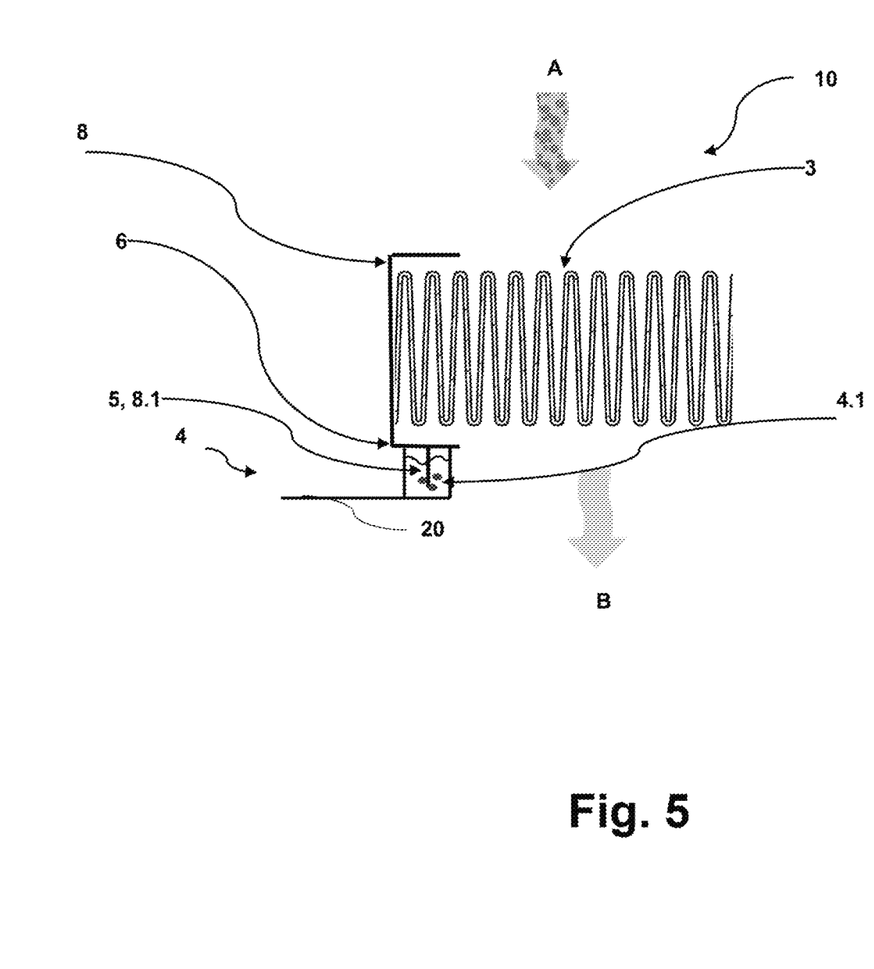
FIG. 5 shows a fifth embodiment of a filter arrangement according to the invention.

In the design variant of the filter arrangement 10 shown in FIG. 5, the pleated filter pack 3 is provided with a filter frame 8. On the underside of the filter frame 8, there is a circumferential bar 8.1, which forms a cutter 5, which dips into the gel channel 4.1. The cover element 6 of the gel channel 4.1 is formed by the filter frame 8 itself, such that no additional elements are required.

Figure 6:
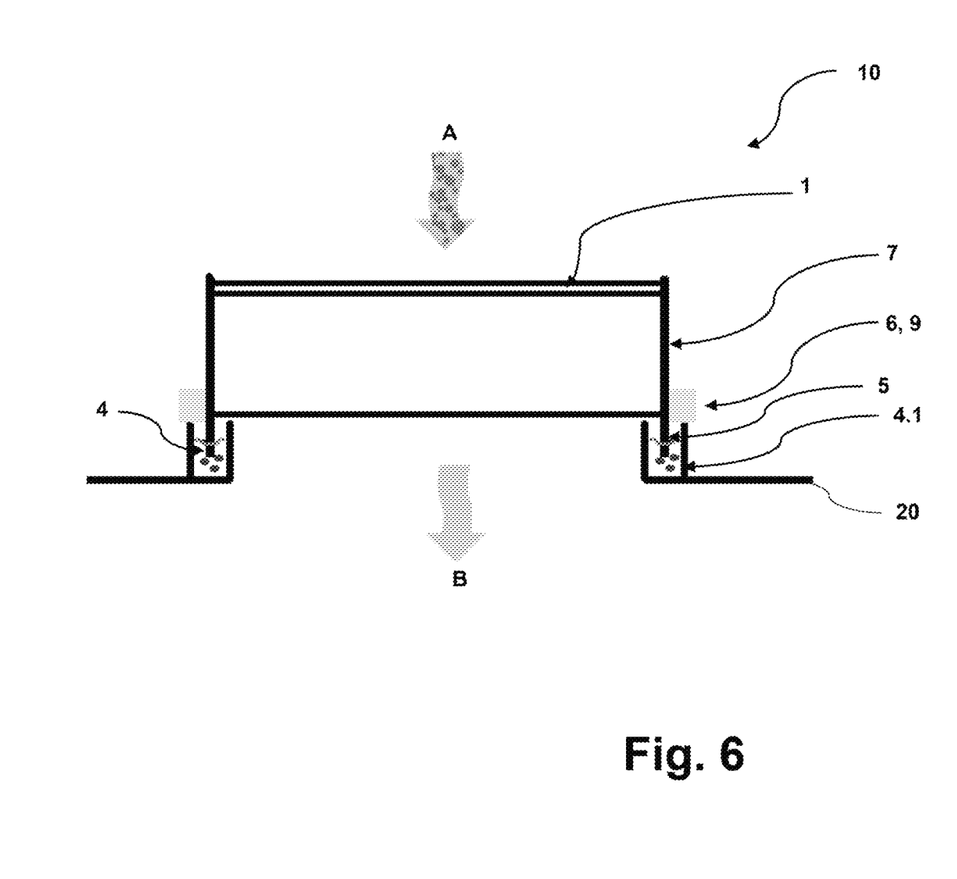
FIG. 6 shows a sixth embodiment of a filter arrangement according to the invention.

FIG. 6 shows an alternative variant for the design of the cover element 6. This can be combined with the different design variants described above of the cutter 5. Thereby, the cover element 6 is formed by a sealing element 9, which encircles the pleated filter pack 3, wherein the sealing element 9 is attached to the filter element 1—for example, is glued to it.

Figure 7:
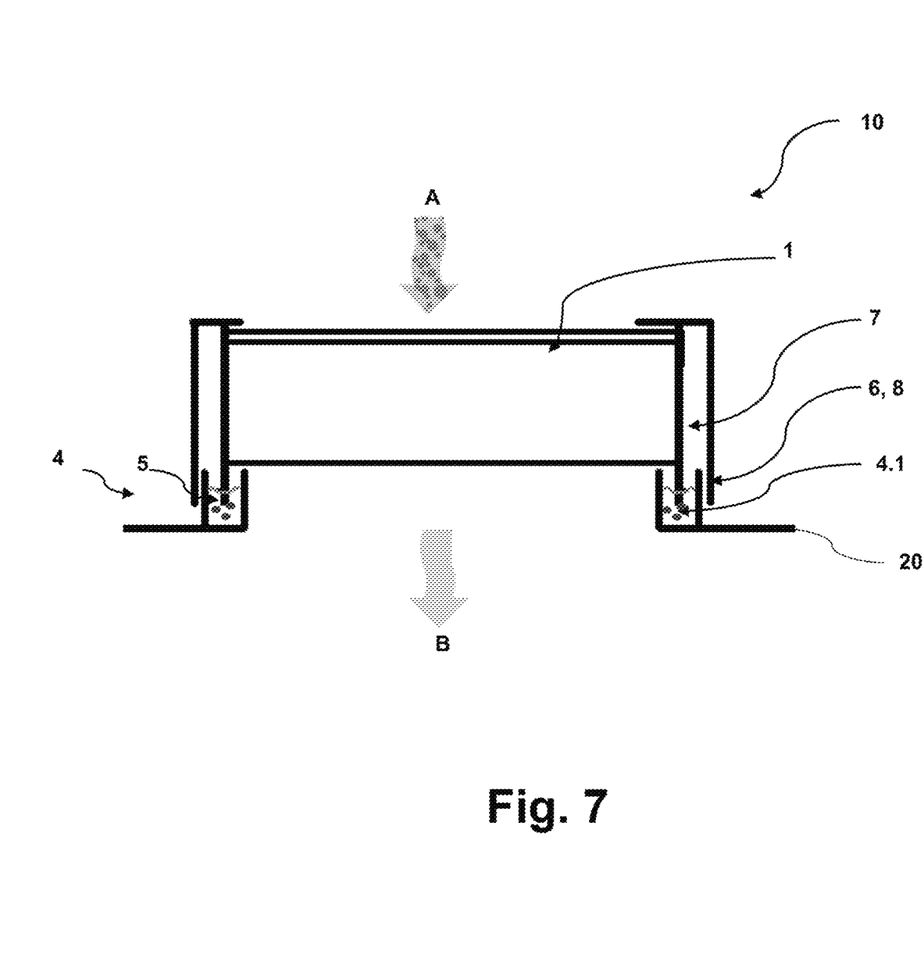
FIG. 7 shows a seventh embodiment of a filter arrangement according to the invention.

An additional variant for the design of the cover element 6 is shown in FIG. 7. Here as well, the cutter 5 can be designed according to one of the design variants described above. The cover element 6 is formed by a frame structure of a filter frame 8. For this purpose, the frame structure 8 includes both the filter element 1 and the gel channel 4.1. In other words, the outer edges of the filter element 1 and the outer edges of the gel channel 4.1 are located within the frame structure of the filter frame 8. The filter frame 8 has an overhang with respect to the edge of the gel channel 4.1, such that there is an overlap in the area of the gel channel 4.1.

In all design variants according to FIGS. 6 through 7, the gel channel 4.1 is attached to the housing 20. In contrast, the cutter 5 is connected to the filter element 1. The filter element 1 is mounted in such a manner that filter element 1 is inserted or pushed into the housing 20, wherein the cutter 5 is dipped into the gel channel 4.1. If it becomes necessary to replace the filter element 1, e.g., because it no longer meets the required filter performance, the gel channel 4.1 remains on the housing 20 and can be used with a newly-inserted filter element 1.

Figure 8:
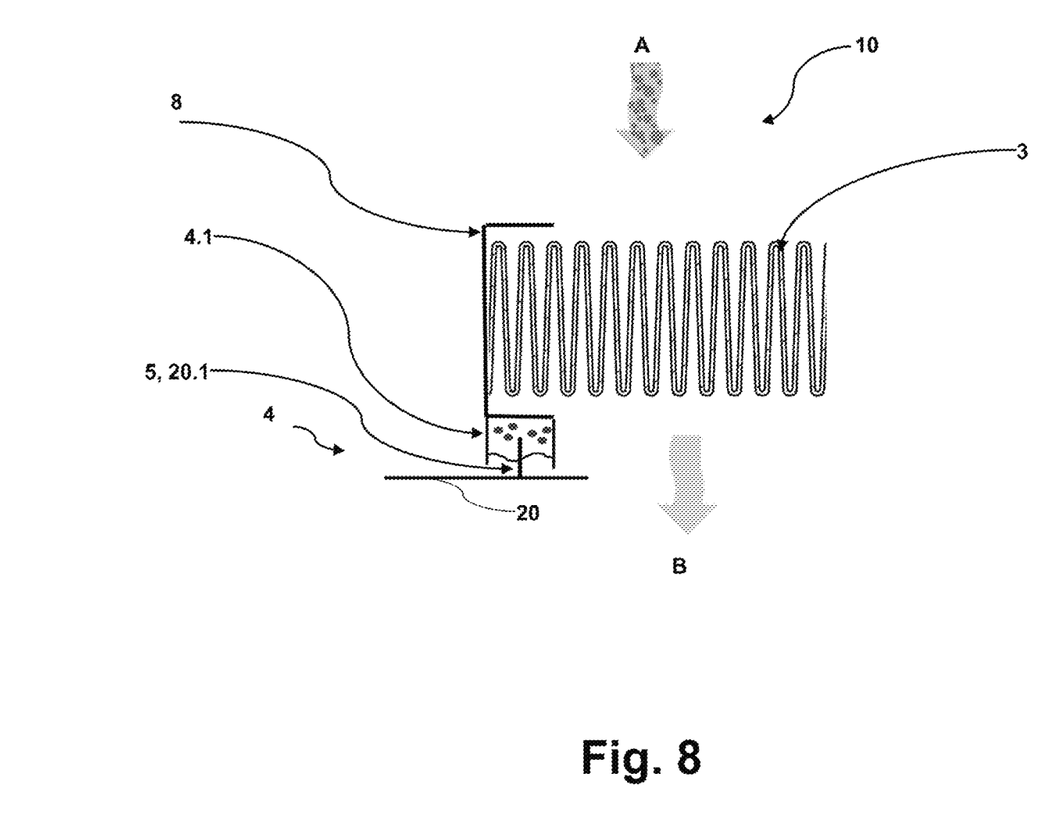
FIG. 8 shows an eighth embodiment of a filter arrangement according to the invention.

In the filter arrangement 10, as shown in FIG. 8, a different approach is taken. Thereby, the gel channel 4.1 is attached to a filter frame 8 of the filter element 1. In contrast, the cutter 5 is formed by a bar 20.1 on the housing 20. Thereby, the bar 20.1 is designed as a strip that is raised with respect to the surface of the housing 20. When the filter element 1 is mounted on the housing 20, the filter element 1 is inserted or pushed into the housing 20 in such a manner that the gel channel 4.1 penetrates the cutter 5 fixed to the housing 20. With this design variant, when filter element 1 is replaced, the gel seal 4 is thus replaced at the same time.

Figure 9:
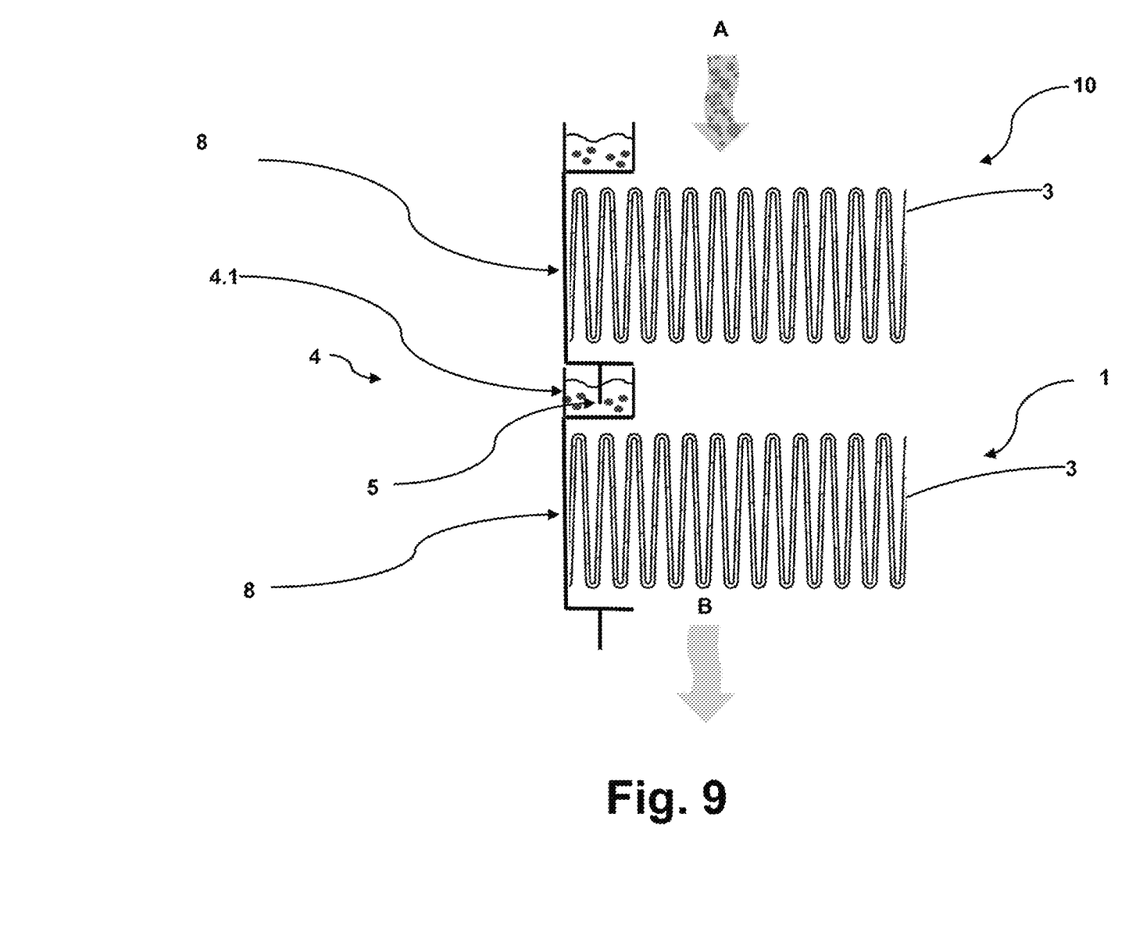
FIG. 9 shows a filter arrangement according to the invention with two filter stages.

FIG. 9 illustrates a filter arrangement 10 with two filter stages having two filter elements 1. Between the first and the at least one further filter element 1, a further circumferential gel seal 4 is arranged for sealing the filter elements 1 from one another. The cover elements 6 can be designed as in the previously described exemplary embodiments.

Figure 10:
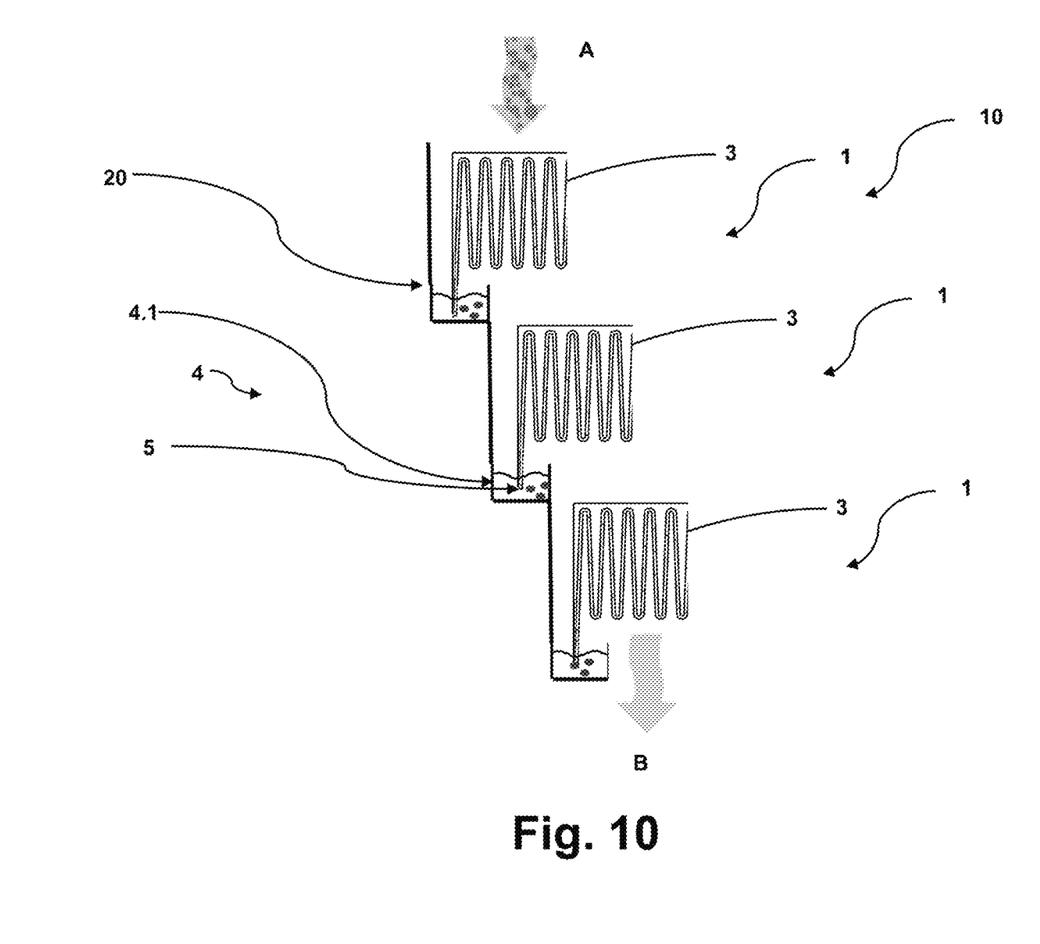
FIG. 10 shows filter arrangement according to the invention with three filter stages.

FIG. 10 illustrates a filter arrangement 10 with three filter stages having three filter elements 1. Between a first respective filter element 1 and the housing 20, a circumferential gel seal 4 is, in each case, arranged for sealing a respective filter element 1 from the housing 20. The cover elements 6 can be designed as in the previously described exemplary embodiments.

The gel seals are also implemented as described above in the embodiments of the filter arrangement with several filter stages.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Filter element
2 Filter material of nonwoven fabric
3 Pleated filter pack
3.1 End pleat
3.2 Flap
4 Gel seal
4.1 Gel channel
4.2 Gel
5 Cutter
6 Cover element
7 Edge strips
7.1 Flap
8 Filter frame
8.1 Bar
9 Sealing element 10 Filter arrangement
20 Housing
20.1 Bar
A Raw gas side
B Clean gas side

What is claimed is:

1. A filter arrangement, comprising:
   a filter element in a first filter stage, the filter element having a filter material configured to filter an air stream;
   a housing configured to receive the filter element;
   a circumferential gel seal arranged between the filter element and the housing in order to seal the filter element in relation to the housing, wherein the circumferential gel seal has a circumferential gel channel,
   wherein the filter arrangement has a circumferential cutter, and the circumferential cutter dips into the circumferential gel channel, and
   wherein the filter arrangement has a circumferential cover element configured to cover an outer circumferential edge of the circumferential gel channel on a raw gas side of the filter arrangement.

2. The filter arrangement according to claim 1, wherein the circumferential cutter comprises an end pleat of the filter material, and/or an edge strip fastened to a filter pack, and/or a bar protruding from a filter frame, and/or a bar protruding from the housing.

3. The filter arrangement according to claim 2, wherein the circumferential cover element comprises a strip-shaped flap at the end pleat of the filter material, and/or a strip-shaped flap on the edge strip fastened to the filter pack, and/or the filter frame for holding the filter element, and/or a sealing element attached to the filter element, and/or the housing.

4. The filter arrangement according to claim 1, wherein the circumferential gel channel is attached to the filter element or to the housing.

5. The filter arrangement according to claim 1, wherein the filter material comprises a pleated filter pack.

6. The filter arrangement according to claim 1, further comprising at least one further filter element in a further filter stage,
   wherein the at least one further filter element has a further filter material configured to filter the air stream, and
   wherein, between the filter element and the at least one further filter element, a further circumferential gel seal is arranged, the further circumferential gel seal being configured to seal the filter elements from one another.

7. The filter arrangement according to claim 1, further comprising at least one further filter element in a further filter stage,
   wherein the at least one further filter element has a further filter material configured to filter the air stream, and
   wherein, between a respective filter element and the housing, a circumferential gel seal is, in each case, arranged, each circumferential gel seal being configured to seal the respective filter element from the housing.

8. A method of using the filter arrangement according to claim 1 as an interior air filter to filter a cabin supply air in a vehicle.

9. The method according to claim 8, wherein the interior air filter comprises a fresh air filter configured to filter the cabin supply air in the vehicle, and
   wherein the vehicle is used in agriculture.

10. The method according to claim 8, wherein the filter element is used in the first filter stage.

11. The filter arrangement according to claim 2, wherein the edge strip is glued to the filter pack.

12. The filter arrangement according to claim 3, wherein the edge strip is glued to the filter pack.

13. The filter arrangement according to claim 1, wherein the circumferential cover element completely covers the circumferential gel channel of the filter arrangement.

* * * * *